March 15, 1932. R. HAMILTON 1,849,144
POWER TAKE-OFF
Filed May 7, 1927
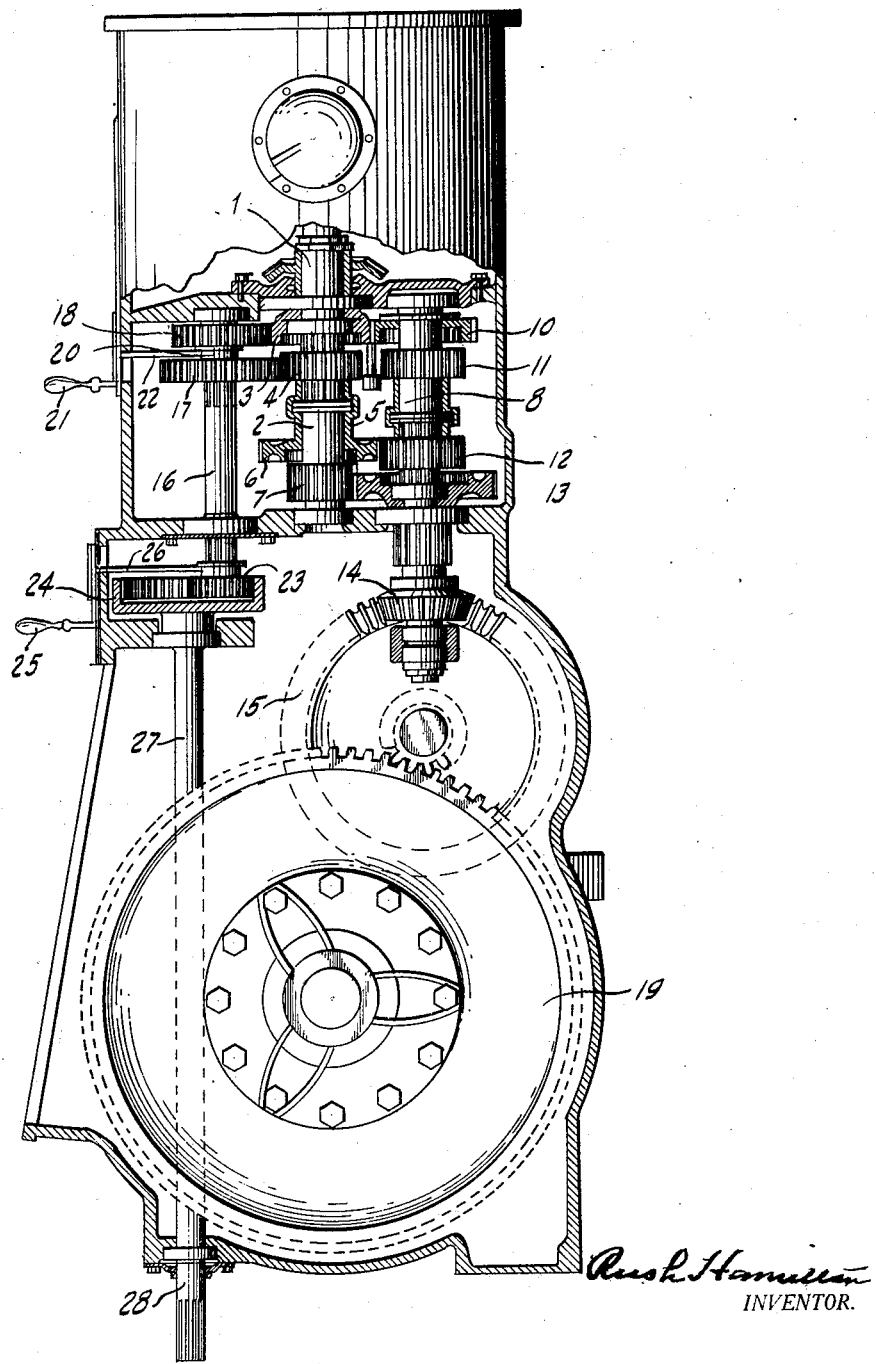
Rush Hamilton
INVENTOR.

Patented Mar. 15, 1932

1,849,144

UNITED STATES PATENT OFFICE

RUSH HAMILTON, OF OAKLAND, CALIFORNIA, ASSIGNOR TO THE STANDARD GAS ENGINE COMPANY, OF OAKLAND, CALIFORNIA

POWER TAKE-OFF

Application filed May 7, 1927. Serial No. 189,713.

This invention relates to supplemental gearing which may be applied to a tractor or other motor vehicle of the shaft-driven type, and aims to provide a power take-off for driving auxiliary machinery or apparatus, and also to provide an additional speed for the vehicle.

One object of the invention is to provide a device which may be attached to or incorporated with a motor vehicle of known type, to enable such vehicle to be used as a stationary power plant without impairing its usefulness for its usual functions.

Another object is to provide a fourth or high-high speed to enable the vehicle to be more rapidly moved over roads.

Further objects will be apparent from the description, taken in connection with the accompanying drawing, in which is shown the application of the invention to a Fordson tractor.

The tractor shown in the drawing is provided with the usual driving shaft 1 which is alined with, and detachably connected to, a driven shaft 2 by means of a gear 3 and a pinion 4, the latter being splined to shaft 2 and attached by means of a collar 5 to a shiftable gear 6. Another gear 7 is fixed to the rear end of shaft 2.

A propeller shaft 8 is mounted below shaft 2 and has gears 10, 11, 12 and 13 mounted thereon in the usual relation to provide for the transmission of power at different speeds to a pinion 14 and ring gears 15 and 19 to drive the tractor.

The power take-off and auxiliary speed mechanism comprises a countershaft 16 mounted above or adjacent the drive shaft 2. Upon the countershaft are mounted two gears 17 and 18, fixed together by a collar 20 and splined to the countershaft so as to be shiftable by means of a handle 21 and shift rod 22. Gears 17 and 18 mesh with gears 4 and 3 respectively to form the supplemental speed, the gear ratio of which will depend upon the ratio of gear 17 to gear 18.

At the rear end of countershaft 16 is splined a pinion 23 which engages the internal gear 24. A handle 25 and shift rod 26 are provided to move the gears 23 and 24 into and out of engagement. Gear 24 is fixed to a power shaft 27 suitably journaled in the tractor frame and having its rear end 28 splined to receive a gear or pulley for driving other machinery.

In the operation of the extra speed, the flow of power is from drive shaft 1, through gear 3, gear 18, gear 17, pinion 4, gear 6, gear 12, and gear 13 to pinion 14. In the embodiment illustrated, the auxiliary speed will be higher than the high speed of the tractor, thus forming a high-high speed.

In the operation of the power take-off, the flow of power is from drive shaft 1, through gear 3, gear 18, countershaft 16, gear 23, and gear 24 to the power shaft 27. It will be evident that by throwing gear 23 out of mesh with gear 24, the auxiliary speed may be used without driving the power shaft 27, and that power shaft 27 may be thrown in or out of operation without interfering with the auxiliary speed gearing.

A further use of the power take-off apparatus is that it is possible to crank the motor of the tractor by rotating shaft 28, thereby turning the motor over more rapidly than could be done by means of the usual hand crank.

I claim:

An auxiliary transmission mechanism for connecting an additional power take-off shaft to the counter shaft of a usual transmission; said mechanism comprising a bearing bracket disposed outside of the usual transmission; a power take-off shaft rotatably supported therein; and internal gear on the end of the power take-off shaft, disposed between the bracket and the usual transmission; a driving pinion slidable on the end of said counter shaft and being rotatable therewith; and means for shifting said pinion into and out of engagement with said internal gear.

In testimony whereof I affix my signature.

RUSH HAMILTON.